United States Patent [19]
Norton

[11] Patent Number: 5,160,608
[45] Date of Patent: Nov. 3, 1992

[54] HIGH EFFICIENCY WATER TREATMENT SYSTEM

[75] Inventor: William W. Norton, Lincolnshire, Ill.

[73] Assignee: Culligan International Company, Northbrook, Ill.

[21] Appl. No.: 763,931

[22] Filed: Sep. 23, 1991

Related U.S. Application Data

[63] Continuation-in-part of Ser. No. 597,207, Oct. 11, 1990, abandoned.

[51] Int. Cl.$^5$ ................. B01D 21/30; B01D 63/00
[52] U.S. Cl. .................... 210/134; 210/137; 210/195.2; 210/257.2; 210/321.72
[58] Field of Search .............. 210/257.2, 137, 134, 210/652, 110, 195.2, 167, 321.72, 321.87, 232

[56] References Cited

U.S. PATENT DOCUMENTS

| | | | |
|---|---|---|---|
| 1,825,631 | 9/1931 | Horvath | 210/321.87 |
| 3,716,143 | 2/1973 | Clark | 210/433 |
| 3,746,640 | 7/1973 | Bray | 210/433 |
| 4,021,343 | 5/1977 | Tyler | 210/257.2 |
| 4,160,738 | 7/1979 | Guter | 210/232 |
| 4,193,872 | 3/1980 | Parkinson | 210/143 |
| 4,604,194 | 8/1986 | Entingh | 210/257.2 |
| 4,609,466 | 9/1986 | McCausland et al. | 210/259 |
| 4,678,565 | 7/1987 | Norton | 210/137 |
| 4,743,366 | 5/1988 | Burrows | 210/110 |
| 4,776,952 | 10/1988 | Burrows | 210/110 |
| 4,853,117 | 8/1989 | Burrows | 210/110 |
| 4,909,934 | 3/1990 | Brown et al. | 210/110 |
| 5,006,234 | 4/1991 | Menon et al. | 210/134 |

FOREIGN PATENT DOCUMENTS

P3719675.8 6/1987 Fed. Rep. of Germany.
G9003553.4 3/1990 Fed. Rep. of Germany.
2237094 7/1973 France.

OTHER PUBLICATIONS

Brochure from BioLab, Inc. entitled: WaterPure. The No-Drain Reverse Osmosis Drinking Water System, Code No. 36749 WTPPW, Unknown date, 4 pages.
Brochure from Culligan International Company, Aqua-Cleer H-83 Reverse Osmosis Drinking Water System, Cat. No. 8195-88, dated Jan., 1990, 4 pages.

Primary Examiner—Robert A. Dawson
Assistant Examiner—Ana Fortuna
Attorney, Agent, or Firm—Gerstman & Ellis, Ltd.

[57] ABSTRACT

A system for treating a portion of water passing through a pressurized water conduit. The system comprises water treatment means such as a reverse osmosis module. An upstream branch line communicates between the pressurized water conduit and the inlet of the water treatment means. Another branch line is provided for connection with pressurized water conduit at a location downstream from the upstream branch line, and communicating with a water outlet of the treatment means. A flow restrictor is provided, positioned in the pressurized water conduit between the conduit connection locations of the respective branch lines. Thus, water can flow through the upstream branch line from the conduit to the water treatment means, and water can flow from the treatment means through the other downstream branch line back to the conduit when water is flowing through the pressurized water conduit.

15 Claims, 1 Drawing Sheet

HIGH EFFICIENCY WATER TREATMENT SYSTEM

CROSS REFERENCE TO RELATED APPLICATION

This is a Continuation-in-Part of the application of William W. Norton U.S. Ser. No. 597,207, filed Oct. 11, 1990, entitled High Efficiency Water Treatment System, now abandoned.

BACKGROUND OF THE INVENTION

There is a need to conserve water, which is in short supply in many areas of the world. Most water treatment processes remove undesired impurities. For example, anions and cations may be removed from water by chemical exchange in water softening, and by what is effectively a filtration technique in reverse osmosis.

In reverse osmosis processes, the waste stream of water often represents a large percentage of the raw feed water stream. Most small, residential reverse osmosis units produce about 5 liters of purified water for every 25 liters of feed water. The remaining 20 liters of water contain concentrated impurities which have been left behind in the main stream, as the purified 5 liters of water have been drawn off.

In the prior art, attempts have been made to avoid the waste of this byproduct water from reverse osmosis. For example, the WaterPure SM system marketed by BioLab Inc. of Decatur, Ga. is a system which recycles the waste water from a reverse osmosis apparatus for household use in secondary faucets, toilets, and appliances, from which drinking of the water is not expected. Thus, all of the water can be used, without waste.

In the WaterPure system, the entire water supply may pass through a reverse osmosis (R. O.) module and/or a water softener. However, to accomplish this, substantial plumbing parts may be required for installation of the system. Particularly, it may be difficult or impossible to install such a system under a kitchen sink or the like, since one must reroute the main water line, which is often a ¾ inch pipe, under the kitchen sink to the R. O. module and then back out again.

On the other hand, the WaterPure apparatus may be installed in connection with a branch line from the main water line, using ⅜ inch water line or the like to communicate with the reverse osmosis module, and then to convey the product water to a drinking water storage tank while also to conveying waste water to a water faucet or the like from which drinking is not intended.

However, while such a system with smaller water lines can be more easily installed under a sink or the like without major plumbing work, and the supply of drinking water produced by such a system may be adequate for a single family, the use of waste water from the module at a single tap may be inadequate to provide enough flow to clear the R. O. module of precipitating waste products, resulting in a phenomenon called "scaling", which can render the module inefficient or inoperative.

Accordingly, there is a need for a water treatment system, for example a reverse osmosis system, which can be easily installed without major plumbing modifications as would be involved in the rerouting of ¾ inch main lines, while at the same time providing sufficient flow of the waste stream by routing it to several outlets, thereby avoiding scaling by increasing the overall flow through the R. O. module.

In Menon et al. U.S. Pat. No. 5,006,234, a reverse osmosis water purification system is provided in which water is tapped off of a main water supply line and passed through a reverse osmosis unit, with the waste water being returned again to the main water supply line. A pressure differential is provided between the point of tapping off of the water and the point of return of the water, to drive water flow through the reverse osmosis unit.

However, the system of Menon et al. is highly subject to the "scaling" phenomenon previously mentioned, which renders the reverse osmosis module inefficient in fairly short order. This is illustrated by the fact that Menon et al. find it necessary to use a normally closed valve to prevent flow of water through the reverse osmosis unit except under the circumstances where a "sufficient dynamic pressure drop" is established to provide a vigorous flow through the reverse osmosis unit to prevent scaling. Under conditions of less vigorous flow in the water supply resulting in merely a low pressure drop, the normally closed valving system, plus a pressure sensor which operates the valve, prevents flow through the reverse osmosis unit of Menon et al.

A reason for this problem, which requires the added expense and inconvenience of an automatic, pressure sensitive valving system, is that the reverse osmosis unit of Menon et al. exhibits a generally conventional Void Volume Ratio of about 0.4. The term "Void Volume Ratio" is defined by the Void Volume within the reverse osmosis unit of the unprocessed water flow path upstream of the membrane (i.e., the volume of the "brine" flow channel) divided by the overall internal volume of the reverse osmosis unit, including the membranes, the support screening, and the product water flow channel.

Additionally, the Menon et al. reverse osmosis unit exhibits a Void Volume (defined as above) divided by the membrane surface area of approximately 0.015 cubic inches per square inch, hereafter called the Void Volume Fraction. When the Void Volume Fraction is this low, scaling problems are increased, so that such a reverse osmosis unit is vulnerable to the acquiring of scale if it is exposed to relatively low flow conditions of the type that are eliminated by the normally closed valve and pressure operated control system of Menon et al.

By this invention, a water treatment system is provided which may be installed without major modifications of the main water line, yet which can be conveniently installed under a sink and elsewhere, with relatively small branch lines communicating with the main line. The water flow passing through the treatment system is spontaneous when water is being drawn through the main line, without the need for pressurization pumps or the like. Thus, the water treatment system of this invention can be used with less plumbing modification and with greater flexibility and versatility, for improved ease and convenience of installation. Despite this, the scaling problem is reduced without the need for a valve to automatically limit flow through the reverse osmosis module when the pressure drop is low.

DESCRIPTION OF THE INVENTION

In this invention, a system is provided for treating a portion of water passing through a pressurized main water conduit. Water treatment means is provided, being typically a reverse osmosis apparatus having a water inlet and two water outlets, a product water outlet and a waste water outlet. An upstream branch line is provided for communication between the pressurized water conduit and the water inlet of the water treatment means. Another branch line is provided for connection between the waste water outlet and the pressurized water conduit at a location downstream from the location of the connection between the upstream branch line and the pressurized water conduit. The product water outlet conducts treated water to a faucet or storage tank.

Flow restrictor means are provided, to be positioned in the pressurized main water conduit between the conduit connection locations of the respective branch lines, to create the pressure drop needed to cause flow through the branch lines to reintroduce the waste stream to the main water conduit.

Thus, the system, when connected to a pressurized water conduit in this manner, permits water to flow through the upstream branch line from the pressurized water conduit to the water treatment means. Likewise, waste water flows from the water treatment means through the other, downstream branch line back to the pressurized water conduit, when water is flowing through the conduit, because of the flow restrictor means.

Thus, water flowing through the pressurized water conduit provides a natural flow through the water treatment means as well, for treatment of just a portion of the supply in the pressurized water conduit. The flow restrictor creates a pressure differential between the upstream and downstream branch lines, which facilitates the flow while water is flowing through the pressurized water conduit.

In the situation where the water treatment means is for reverse osmosis, the product water outlet is the source of purified product water from the reverse osmosis device. This purified product water outlet may be connected to a water storage reservoir, which is typically called a "burp tank", to provide a constant source of the purified water to the user without regard to whether the reverse osmosis cell is producing purified product water at that moment or not.

Accordingly, the water treatment means, such as a spiral wound or hollow fiber reverse osmosis unit or other membrane module, can have a flow of water across the membrane to sweep away its highly concentrated waste stream, and to avoid plugging or "scaling" of the membrane surface by minerals and other compounds. At the same time, flexible or rigid, small-bore tubing can be used for the branch lines, for connecting the water treatment unit to the pressurized water conduit, without the need of repressurization pumps to obtain the desired circulation.

Also in accordance with this invention, the membrane-type reverse osmosis module has a Void Volume Ratio of at least 0.5 up to about 0.9, and preferably 0.6–0.8. This Void Volume Ratio is as previously defined.

Furthermore, in accordance with this invention the reverse osmosis module preferably defines a Void Volume Fraction of at least about 0.02, and preferably 0.022 to 0.03, cubic inch per square inch of membrane.

When the Void Volume Ratio, and preferably the Void Volume Fraction are respectively at values of at least 0.5 and 0.02, the resulting reverse osmosis module exhibits a resistance to scaling, which significantly reduces the scaling rate compared with reverse osmosis modules having significantly lower Void Volume Ratios and Void Volume Fractions. One reason for this is that a reverse osmosis module having a higher Void Volume Ratio and Void Volume Fraction results in less concentration of the brine stream as water passes through the reverse osmosis membrane, because the brine flow path is thicker and of greater volume. Thus, there is less tendency for solutes to precipitate out of the water as they are concentrated less by the loss of water through the membrane. With less solute concentration, there is less scaling.

Accordingly, an unexpected combination is achieved in this invention of a reverse osmosis unit having the desired high Void Volume Ratio and preferably the Void Volume Fraction, so that the flow of water at relatively low pressure drops through the reverse osmosis module will not result in an undue amount of scaling, contrary to the situation in the Menon et al. patent, cited above. Thus, a pressure sensitive flow control valve to protect the reverse osmosis unit from low pressure flow conditions is not required, contrary to the situation illustrated in the Menon et al. patent.

It is also desirable for the total flow impedance of water through (1) the flow restrictor means in the pressurized water conduit, and (2) the branch lines and water treatment means, to be not much higher than the flow impedance of an unmodified short segment of the pressurized water conduit typically a five foot segment. By this means, only a minor pressure drop is added to the pressurized water flow in the conduit, particularly at relatively low flow rates, which complies with many plumbing codes. The flow rate can be low and still clear the R. O. module of waste.

DESCRIPTION OF SPECIFIC EMBODIMENT

Figure 1:
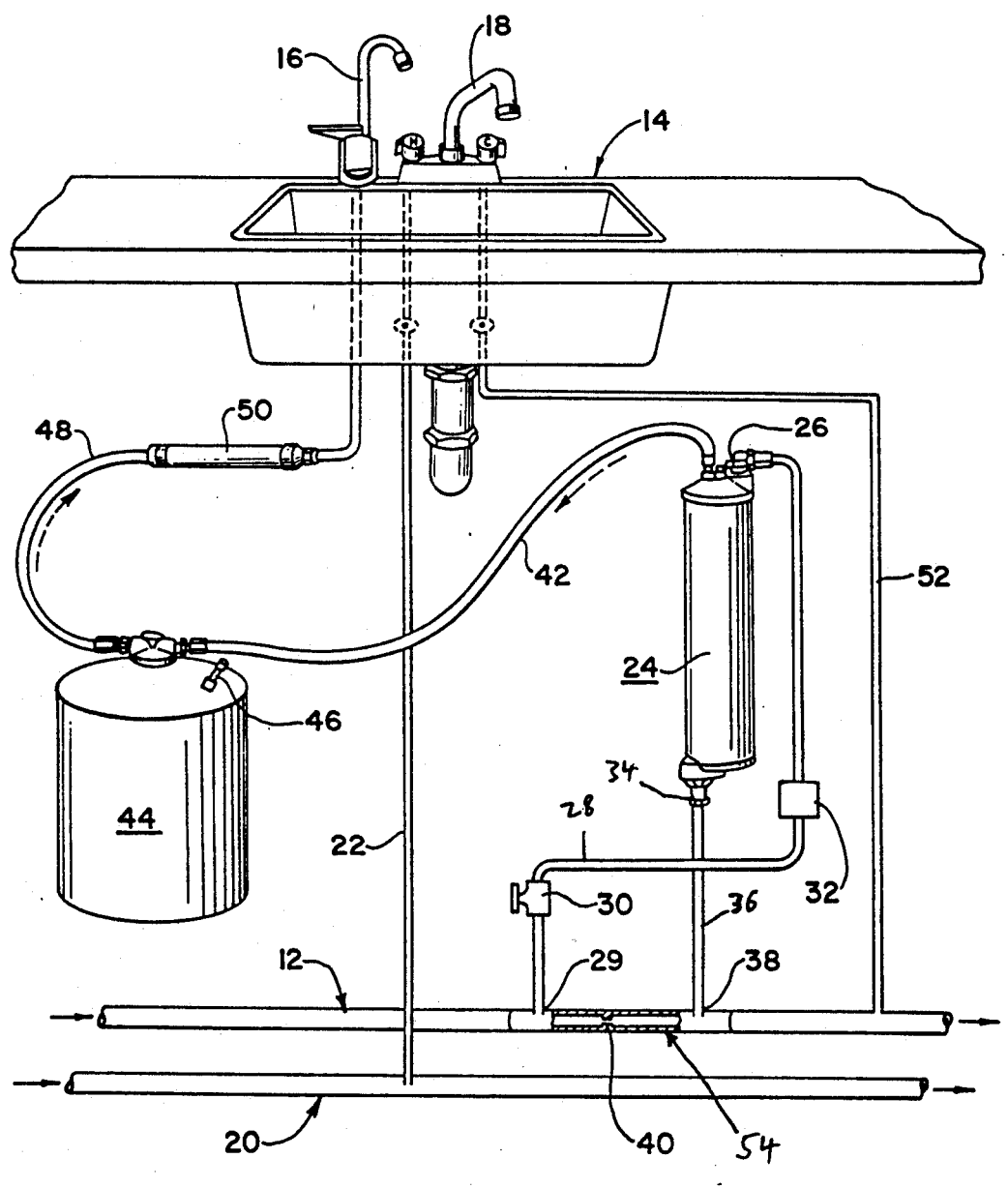
FIG. 1 is a schematic view of the water treatment system in accordance with this invention.

Referring to the drawing, the water treatment system 10 in accordance with this invention is shown to be connected with the main cold water supply line 12 of a home or the like, and also to be connected to a sink 14 having a faucet 16 for drinking water and a general purpose faucet 18.

A main hot water line 20 is also shown, which connects through a conventional line 22 to faucet 18.

Reverse osmosis (R. O.) module 24 is shown, being positionable as desired under a sink or the like in an out-of-the-way position. R. O. module 24 may be of generally conventional spiral or hollow fiber design per se, comprising a single liquid inlet 26 which communicates through a "brine" flow path upstream of a reverse osmosis membrane, which flow path extends along the membrane to an outlet 34. Also, a second outlet in the R. O. module 24 communicates with line 42, this outlet being positioned on the opposite side of the membrane system from inlet 26 and outlet 34 so that only purified product water passes through line 42.

In accordance with this invention, the Void Volume of the flow path from inlet 26 to outlet 34 along but not through the reverse osmosis membrane may be about 14.4 cubic inches, while the total inner volume of the module 24 is about 24 cubic inches, whereby the Void Volume Ratio of reverse osmosis module 24 is about 0.6. Similarly, the Void Volume Fraction of R. O. module is about 0.0225 cubic inches per square inch of membrane area.

R. O. module 24 is connected at its inlet 26 by an upstream branch line 28 through a relatively upstream connection point 29 in main water line 12. Branch line 28 may, if desired, carry a control flow valve 30 and a scale inhibitor unit 32 for hard water installations, both being of conventional design.

As is conventional, R. O. module 24 has two outlets. Outlet 34 for the waste water connects to downstream branch line 36 which, in turn, connects to a downstream location 38 of main water line 12. Between upstream connection 29 and downstream connection 38 in line 12 there is positioned a flow restrictor 40 of any desired type, for example an inner sleeve carried within main line 12 to restrict the cross-sectional area of the line for a short distance. Thus, when water is flowing through main line 12, a pressure differential is created between locations 29 and 38. Accordingly, spontaneous flow takes place through upstream branch line 28, R. O. module 24, and downstream branch line 36, with the waste water from R. O. module 24 rejoining the flow in main line 12 again at location 38.

When such flow is taking place, reverse osmosis product water, being purified and with a reduced ion content, is produced and conveyed through purified water outlet line 42 to a storage tank 44, which tank may be pressurized in conventional manner through air pressure valve 46, so that water can freely flow from tank 44 through supply line 48 to faucet 16. Carbon filter 50 may be provided if desired for final purification of the drinking water as conveyed to faucet 16.

Accordingly, purified drinking water may be spontaneously produced by R. O. module 24 and provided to supply tank 44 every time water runs through main line 12. At the same time, there is no wasted water from the operation of R. O. module 24, because the waste water rejoins the main water line 12 at location 38. Main water line 12 may thus supply any desired number of other water-using units, without any significant loss of water flow capacity as takes place in other systems making use of an in-line R. O. module or the like.

For example, water may be conveyed from main line 12 through branch line 52 to faucet 18 as the cold water source. Thus faucet 18 may be supplied with both hot and cold water, while at the same time drinking water may be supplied by faucet 16, without any waste of water whatsoever. Additionally, other water-consuming devices are desirably connected to main water line 12 in a conventional manner to increase flow through the R. O. unit.

Along with this, R. O. unit 24 may be conveniently stored, and connected with small, flexible lines to the desired connection points 29, 38, so that the installation of R. O. unit 24 may take place with a relatively small plumbing job involving relatively minor modifications of main water line 12. Specifically, a special pipe section 54 may be connected into main line 12 in conventional manner. Pipe section 54 may define connections 29, 38 plus flow restrictor 40, and may be sold as a part of water treatment system 10.

The above has been offered for illustrative purposes only, and is not intended to limit the scope of the invention of this application, which is as defined in the claims below.

That which is claimed is:

1. A system for treating a portion of water passing through a pressurized conduit, which comprises: a reverse osmosis membrane module having a water inlet and product water and waste water outlets; an upstream branch line for communication between said pressurized water conduit and said water inlet; another branch line for connection to said pressurized water conduit at a location downstream from said upstream branch line and communicating with the waste water outlet; and flow restrictor means for positioning in said pressurized water conduit between the conduit connection locations of the respective branch lines, whereby water can flow through said upstream branch line from the conduit to said water treatment means, and water can flow from the treatment means through the other downstream branch line back to the conduit when water is flowing through said conduit, said reverse osmosis module having a Void Volume Ratio of at least about 0.5.

2. The water treatment system of claim 1 in which said reverse osmosis module has a Void Volume Fraction of at least about 0.02 cubic inch per membrane square inch.

3. The water treatment system of claim 1 which is free of means to prevent low pressure water flow through said reverse osmosis module.

4. The water treatment means of claim 1 in which said product water outlet is connected to a water storage reservoir.

5. The water treatment system of claim 1, connected as described to said pressurized water conduit.

6. The water system of claim 5 in which the total flow impedance of water through (1) said flow restrictor means and (2) said branch lines and water treatment means operate together to form a total flow impedance which is not substantially higher than the flow impedance of an unmodified, five foot segment of said pressurized water conduit.

7. The water treatment system of claim 1 in which said Void Volume Ratio is 0.6 to 0.8

8. The water treatment system of claim 1 in which said Void Volume Fraction is 0.022 t 0.03 cubic inch per membrane square inch.

9. A system for treating a portion of water passing through a pressurized conduit, which comprises: a reverse osmosis membrane module having a water inlet and product water and waste water outlet, an upstream branch line communicating between said pressurized water conduit and said water inlet; another branch line communicating with said pressurized water conduit at a location downstream from said upstream branch line and communicating with the waste water outlet; and flow restrictor means positioned in said pressurized water conduit between the conduit connection locations of the respective branch lines, whereby water can flow through said upstream branch line from the conduit to the reverse osmosis module, and water can flow from the reverse osmosis module through the other, downstream branch line back to the pressurized water conduit when water is flowing through said conduit, said reverse osmosis module having a Void Volume Ratio of at least about 0.6 and a Void Volume Fraction of at least about 0.02 cubic inch per membrane square inch, said water treatment system being free of means to prevent low pressure water flow through said reverse osmosis module.

10. The water treatment system of claim 9 in which said Void Volume Ratio is 0.65 to 0.8

11. The water treatment system of claim 9 in which said Void Volume Fraction is 0.022 to 0.03 cubic inch per membrane square inch.

12. The water treatment means of claim 9 in which said product water outlet is connected to a water storage reservoir.

13. The water treatment system of claim 12 in which the total flow impedance of water through (1) said flow restrictor means and (2) said branch lines and water treatment means operate together to form a total flow impedance which is not substantially higher than the flow impedance of an unmodified, five foot segment of said pressurized water conduit.

14. A system for treating a portion of water passing through a pressurized conduit, which comprises: a reverse osmosis membrane module having a water inlet and product water and waste water outlets, an upstream branch line communicating between said pressurized water conduit and said water inlet; another branch line communicating with said pressurized water conduit at a location downstream from said upstream branch line and communicating with a waste water outlet; and flow restrictor means positioned in said pressurized water conduit between the conduit connection locations of the respective branch lines, whereby water can flow through said upstream branch line from the conduit to the reverse osmosis module, and water can flow from the reverse osmosis module through the other, downstream branch line back to the pressurized water conduit when water is flowing through said conduit, said reverse osmosis module having a Void Volume Fraction of at least about 0.02 cubic inch per membrane square inch.

15. The water treatment system of claim 14 in which said Void Volume Fraction is 0.022 to 0.03 cubic inch per membrane square inch.

* * * * *